US006431535B1

(12) United States Patent
Volpe

(10) Patent No.: US 6,431,535 B1
(45) Date of Patent: Aug. 13, 2002

(54) MOTOR TEST MOUNT WITH CG POSITION ADJUSTMENT

(76) Inventor: Ronald M. Volpe, 433 N. Sparks St., Burbank, CA (US) 91605

( * ) Notice: Subject to any disclaimer, the term of this patent is extended or adjusted under 35 U.S.C. 154(b) by 0 days.

(21) Appl. No.: 10/013,058

(22) Filed: Oct. 30, 2001

(51) Int. Cl.[7] .................................................. B23Q 1/00
(52) U.S. Cl. ........................................................ 269/47
(58) Field of Search ............................. 269/47, 82, 83, 269/84, 17, 71; 188/72.7, 17

(56) References Cited

U.S. PATENT DOCUMENTS 3,765,667 A 10/1973 Christiansen
4,533,127 A 8/1985 Hawkins
4,588,165 A 5/1986 Stellato et al.
4,705,264 A * 11/1987 Hawkins et al. .............. 269/17
4,771,980 A 9/1988 Dubbs et al.
D324,599 S * 3/1992 Bailey ......................... D34/31
5,692,738 A * 12/1997 DuVernay et al. ............ 269/82
6,318,699 B1 * 11/2001 Williams ..................... 269/82

* cited by examiner

*Primary Examiner*—Joseph J. Hail, III
*Assistant Examiner*—Lee Wilson
(74) *Attorney, Agent, or Firm*—Gene Scott-Patent Law & Venture Group

(57) ABSTRACT

A motor test mount apparatus comprises a mount cylinder having bearings fitted for supporting a bearing rod positioned for rotation within the bearings. A mount block and a capping screw each are axially and threadedly engaged with the bearing rod at opposing ends wherein the capping screw is adapted for drawing the mount block toward the mount cylinder upon rotation of the capping screw. A motor mounting plate is engaged with the mount block and is adapted for selective positioning in a mounting plane orthogonal to a rotational axis of the mount cylinder. A plurality of motor mounting arms are adapted for securing a motor to the motor mounting plate, whereby the center of gravity of the motor may be positioned on the rotational axis by adjustment of the mounting plate position in the mounting plane.

6 Claims, 3 Drawing Sheets

MOTOR TEST MOUNT WITH CG POSITION ADJUSTMENT

BACKGROUND OF THE INVENTION

1. Field of the Invention

This invention relates generally to test fixtures for heavy equipment and more particularly to a motor test mount with adjustable test part positioning for placing its center of gravity on a rotational axis of the mount.

2. Description of Related Art

The following art defines the present state of this field:

Christiansen, U.S. Pat. No. 3,765,667 describes an engine stand for supporting an engine such as an automobile power plant for repair or other work including a support post having a slotted adaptor plate to which the rear portion of certain designs of engines can be solely supported. The engine is attached to the adaptor plate by adjustable brackets which readily allow the approximate longitudinal axis passing through the center of gravity of the engine to be aligned with the center line of the rotatable adaptor plate. A chain brake is utilized to secure the angular position of the adaptor plate whereby the engine being supported on the stand may be rotated and secured in any selected angular orientation. The engine stand further includes a removable second post member mounted in spaced relationship with the first post to mount engines on the stand, which because of their design, are not advantageously supported solely at the rear.

Hawkins, U.S. Pat. No. 4,533,127 describes a wheeled stand especially useful as an automotive engine stand wherein a post is inclined rearwardly from its point of attachment between outwardly tapering sections which form a longitudinal base portion, said post being tilted rearwardly and supported by upright straps. A wheel locking mechanism is provided wherein a threaded member is vertically disposed and provided with a wing portion, said threaded member being movable in and out of locking engagement with a peripheral portion of the wheel.

Stellato et al., U.S. Pat. No. 4,588,165 describes a combination engine stand and engine puller crane wherein the base frame of the engine puller crane removably interlocks with the base frame of the engine stand allowing one person to remove an engine from a motor vehicle by the use of the engine puller crane and then secure the engine to the engine stand.

Dubbs et al., U.S. Pat. No. 4,771,980 describes a stand or support for various kinds and types of small motors, generators and air compressors while servicing them, as well as testing them under running conditions, the stand or support having a bracket attachable to a bench or vertical post and a simple frame being supported for rotation thereon. The frame comprises an elongated angle iron member to one end of which an engine support is connected fixedly and perpendicularly thereto and a second similar engine support extends perpendicularly from the elongated member and is longitudinally adjustable therealong but is adapted to be clamped at any desired location thereon for attachment of a small engine or the like to the engine supports in accordance with the position of bolt holes on the engine or other type of small device.

NuVemay et al., U.S. Pat. No. 5,692,738 describes a work fixture brake including a first block and a second block and a brake disc. The first block has a first axis of rotation passing therethrough and a first friction pad fixed thereto. The second block is axially juxtaposed the first block and is pivotably connected thereto at a second axis of rotation offset from the first axis of rotation. A second friction pad is rotatively fixed to the second block. A brake disc has a first side facing the first friction pad and an oppositely disposed second side facing the second friction pad. The brake disc is approximately centered on the first axis of rotations. Means for axially separating the first block from the second block are disposed therebetween. The means are responsive to a rotative force against the second block in a direction which would induce rotation about the first axis of rotation. The means thereby axially separates the first friction pad and the second friction pad, in turn releasing the brake disc.

The prior art teaches the use of motor test stands similar to the instant invention, but does not teach such a stand able to position the center of gravity of the test piece at the rotational axis of the stand. The present invention fulfills these needs and provides further related advantages as described in the following summary.

SUMMARY OF THE INVENTION

The present invention teaches certain benefits in construction and use which give rise to the objectives described below.

A motor test mount apparatus comprises a mount cylinder having bearings fitted for supporting a bearing rod positioned for rotation within the bearings. A mount block and a capping screw each are axially and threadedly engaged with the bearing rod at opposing ends wherein the capping screw is adapted for drawing the mount block toward the mount cylinder upon rotation of the capping screw. A motor mounting plate is engaged with the mount block and is adapted for selective positioning in a mounting plane orthogonal to a rotational axis of the mount cylinder. A plurality of motor mounting arms are adapted for securing a motor to the motor mounting plate, whereby the center of gravity of the motor may be positioned on the rotational axis by adjustment of the mounting plate position in the mounting plane.

A primary objective of the present invention is to provide an apparatus and method of use of such apparatus that provides advantages not taught by the prior art.

Another objective is to provide such an invention capable of supporting a motor at any selected rotational angle.

A further objective is to provide such an invention capable of positioning the center of gravity of the motor on the rotational axis of the invention so that the motor may more easily be rotated to a desired position.

A still further objective is to provide such an invention capable of being easily adapted to various motor configurations.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
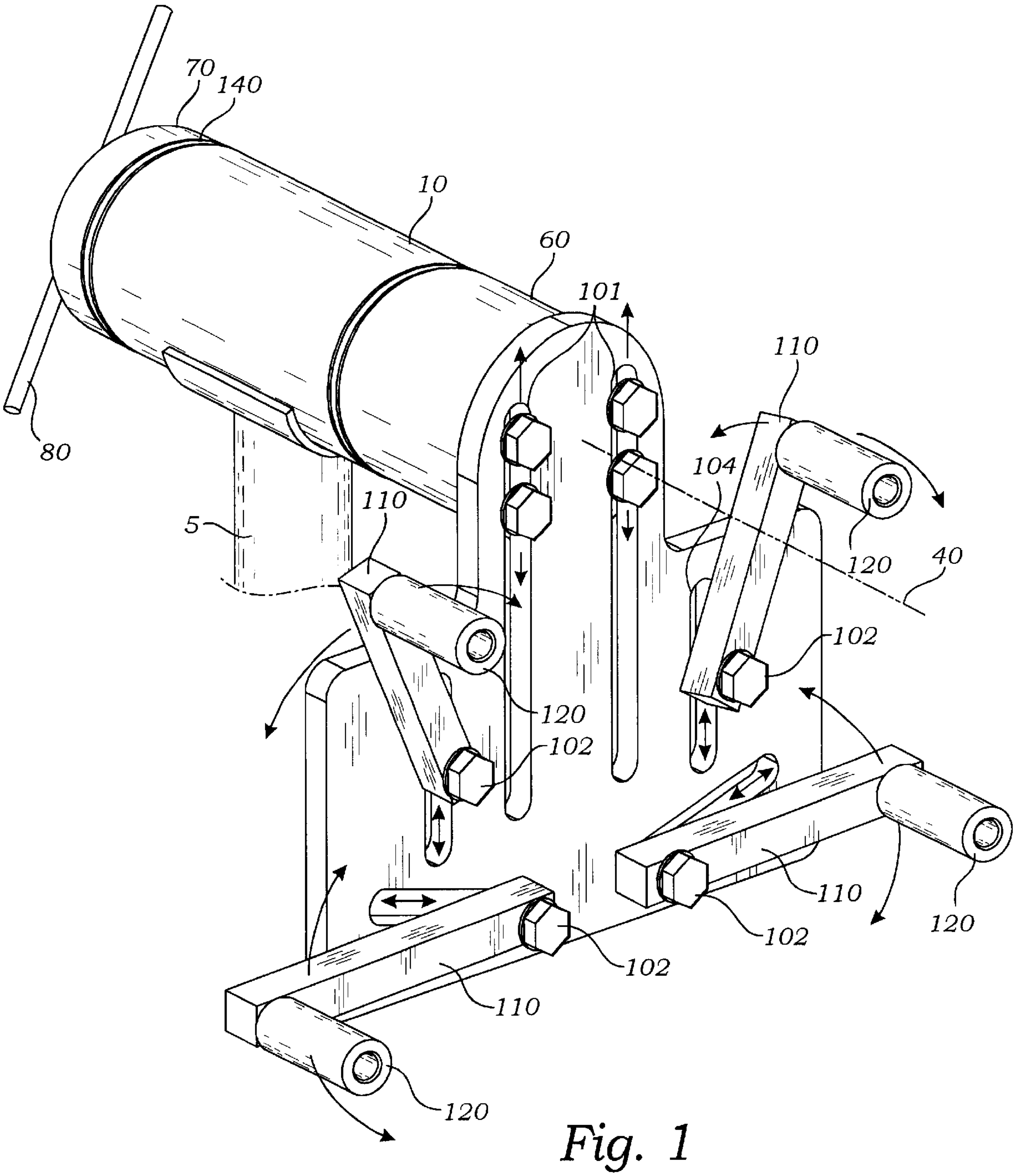
FIG. 1 is a perspective view of the preferred embodiment of the invention.
Figure 2:
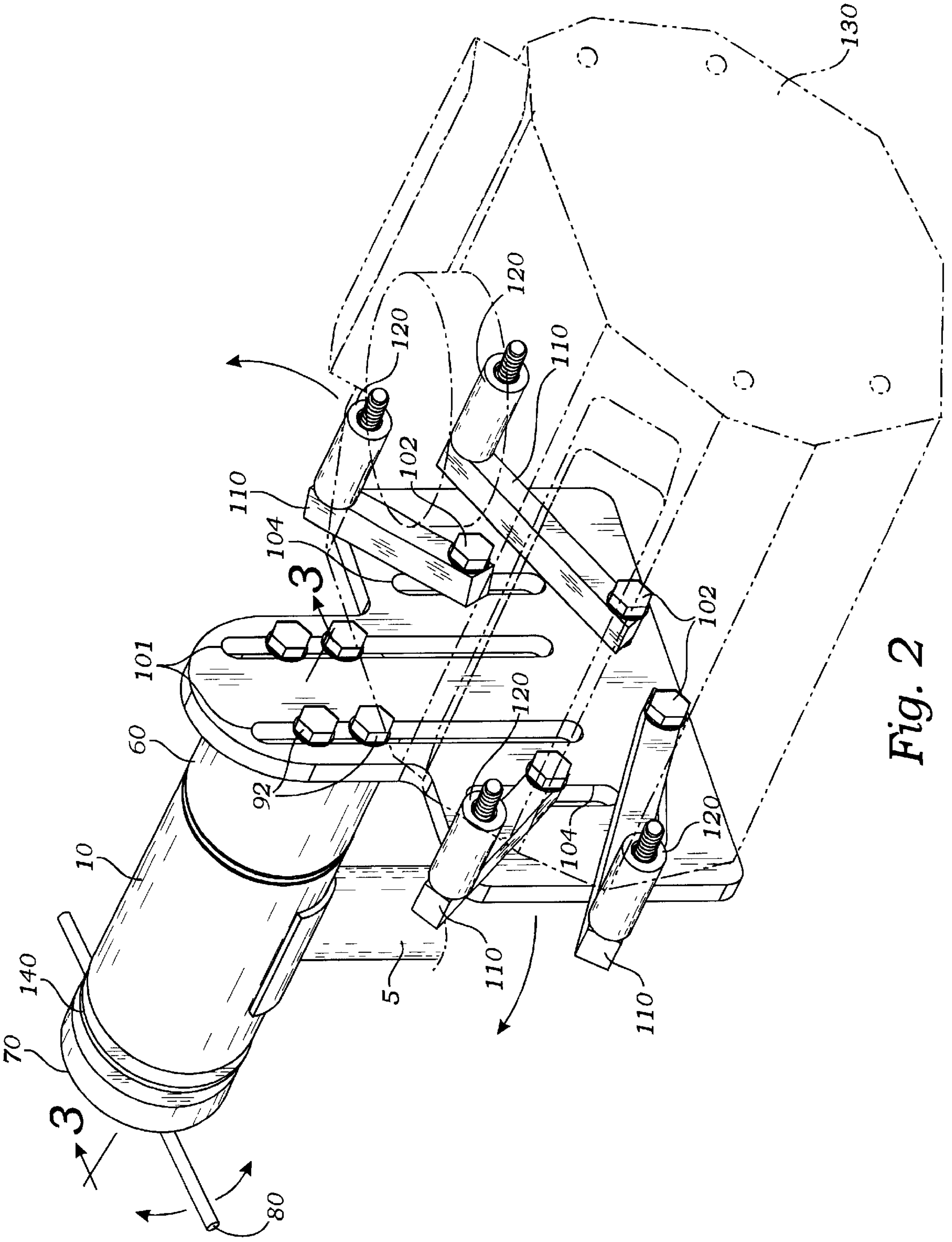
FIG. 2 is similar to FIG. 1 showing the manner in which a motor is mounted onto the invention.
Figure 3:
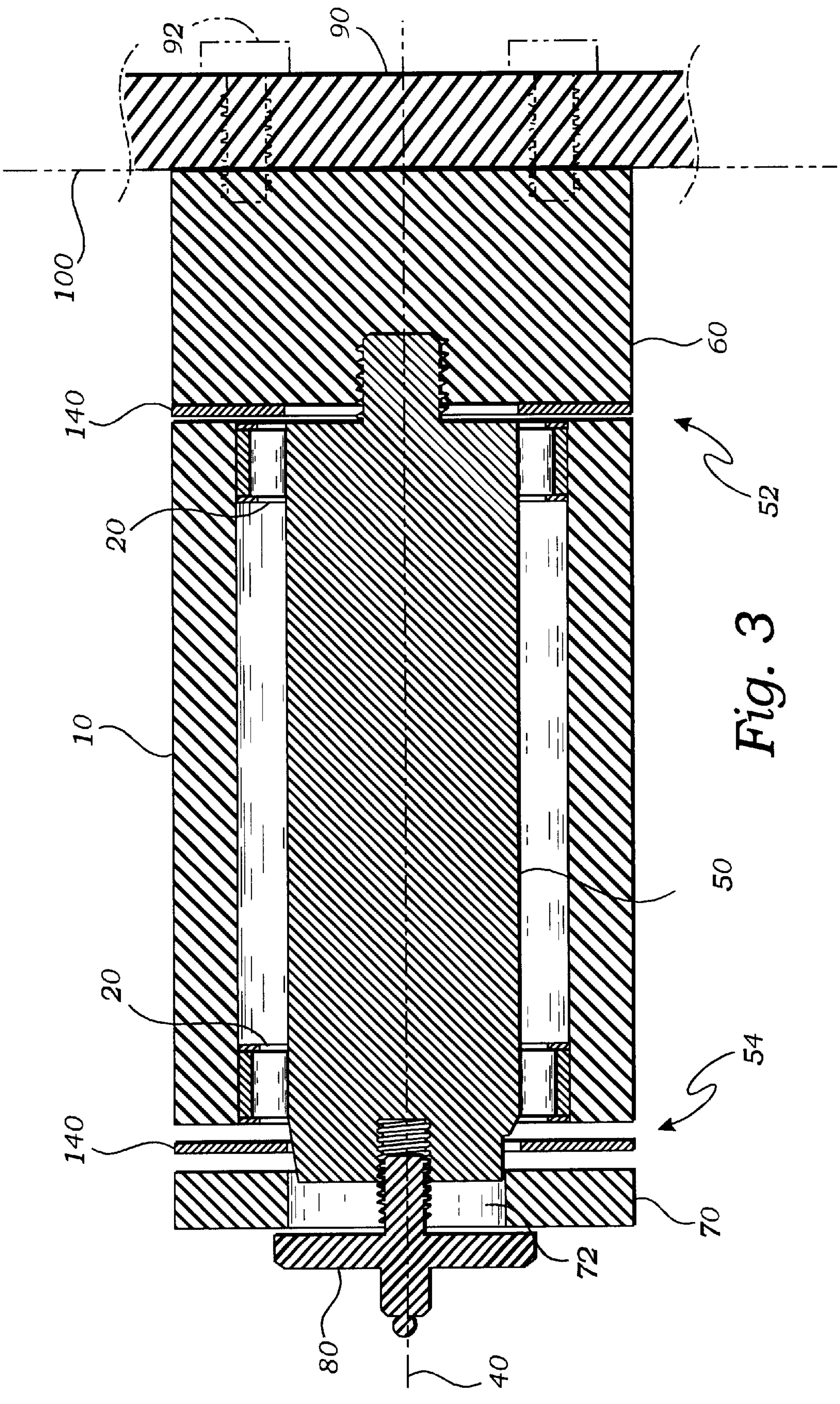
FIG. 3 is a sectional view thereof taken along line 3—3 in FIG. 2.

The present invention is a motor test mount apparatus made of structural metal formed into several simple shapes by common machining and threading operations and welding. The apparatus includes a mount cylinder 10 having bearing means such as bearing assemblies 20 fitted therein at opposing ends. This is clearly shown in FIG. 3. The mount cylinder 10 is positioned for being supported at any selected fixed height above a supporting surface, not shown, but which would typically be a garage floor surface. Arm 5, shown in FIGS. 1 and 2 may be a part of a supporting frame, not part of the present invention, but which might be welded to the cylinder 10 for supporting the invention in its preferred attitude. The rotational axis 40 would then be positioned in parallel to the supporting surface, generally horizontally. A circular bearing rod 50 is positioned within the bearing assemblies 20 and is fitted and enabled for rotation within them. A mount block 60 is axially engaged with the bearing rod 50, at one end 52, in a threaded relationship as best seen in FIG. 3, so as to be adapted for drawing the mount block 60 toward the mount cylinder 10. A capping disk 70 is also axially engaged with the bearing rod 50 at an opposing end 54 and is fitted with hole 72 for achieving a sliding relationship adapted for drawing the capping disk 70 toward the mount cylinder 10 upon rotation of a capping screw 80 which is threaded into the opposing end 54 of the bearing rod 50. A motor mounting plate 90 is engaged with the mount block 60, using hex head bolts 92 into threaded holes in the face of plate 90, and the motor mounting plate 90 is adapted for selective positioning in slots 101 in mounting plane 100 which is orthogonal to the rotational axis 40. A plurality of mounting arms 110 are adjustably positionable on the motor mounting plate 90 and each of the mounting arms 110 provides a mounting tube 120 adapted for receiving mounting bolts 120 for engagement with a motor 130 such that the motor 130 may be held fixedly to the mounting arms 110 and whereby the center of gravity of the motor 130 may be positioned on the rotational axis 40 by adjustment of the mounting plate's position in the mounting plane 100. As can be seen in FIG. 1 or FIG. 2, the mounting arms 110 are attached with bolts 102 and nuts (not shown). These arms can be secured to mounting plate 90 at any angle and positioned within the several slots 104 cut into the plate 90. In this manner, the arms may be positioned for attachment of a wide range of different motors or other test parts. Preferably, a first and/or a second friction producing means such as friction disks 140 may be positioned between the mount cylinder 10 and the mount block 60 and between the mount cylinder 10 and the capping disk 70 to provide friction between these parts so as to hold the workpiece 130 at any rotational position.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A motor test mount apparatus comprising: a mount cylinder having bearing assemblies fitted therein at opposing ends thereof, the mount cylinder positioned for being supported at a fixed height above a supporting surface with a rotational axis of the mount cylinder parallel to said supporting surface; a bearing rod positioned within the bearing assemblies and enabled for rotation therein; a mount block axially engaged with the bearing rod at one end thereof in a threaded relationship adapted for drawing the mount block toward the mount cylinder; a capping disk axially engaged with the bearing rod at an opposing end thereof in a sliding relationship adapted for drawing the capping disk toward the mount cylinder upon rotation of a capping screw threaded into the opposing end of the bearing rod; a motor mounting plate engaged with the mount block, the motor mounting plate adapted for selective positioning in a mounting plane orthogonal to the rotational axis of the mount cylinder; a plurality of mounting arms adjustably positionable on the motor mounting plate, each of the mounting arms providing a mounting tube adapted for receiving mounting screws for engagement with a motor such that the motor may be held fixedly to the mounting arms and whereby the center of gravity of the motor may be positioned on the rotational axis by adjustment of the mounting plate position in the mounting plane.

2. The apparatus of claim 1 further comprising a friction disk mounted between the mount cylinder and the mount block.

3. The apparatus of claim 1 further comprising a friction disk mounted between the mount cylinder and the capping disk.

4. The apparatus of claim 1 further comprising a first friction disk mounted between the mount cylinder and the mount block and a second friction disk mounted between the mount cylinder and the capping disk.

5. A motor test mount apparatus comprising: a mount cylinder having bearing means fitted therein; a bearing rod positioned for rotation within the bearing means; a mount block and a capping screw each axially and threadedly engaged with the bearing rod at opposing ends thereof; the capping screw adapted for drawing the mount block toward the mount cylinder upon rotation of the capping screw; a motor mounting plate engaged with the mount block and adapted for selective positioning in a mounting plane orthogonal to a rotational axis of the mount cylinder; a plurality of motor mounting means adapted for securing a motor to the motor mounting plate, whereby the center of gravity of the motor may be positioned on the rotational axis by adjustment of the mounting plate position in the mounting plane.

6. The apparatus of claim 5 further comprising a friction producing means engaged with the mount cylinder.

* * * * *